United States Patent
MacDonald (10) Patent No.: US 7,898,805 B2
(45) Date of Patent: Mar. 1, 2011

(54) CENTRAL PRESSURING FAN WITH BOTTOM INLETS FOR NOTEBOOK COOLING

(75) Inventor: Mark MacDonald, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/618,754

(22) Filed: Dec. 30, 2006

(65) Prior Publication Data

US 2008/0156004 A1    Jul. 3, 2008

(51) Int. Cl.
*H05K 7/20*    (2006.01)

(52) U.S. Cl. ............. 361/695; 361/679.46; 361/679.48; 361/679.49; 361/679.5; 361/719; 165/104.33; 174/16.1

(58) Field of Classification Search ................ None
See application file for complete search history.

(56) References Cited

U.S. PATENT DOCUMENTS

| | | | |
|---|---|---|---|
| 5,694,294 A * | 12/1997 | Ohashi et al. | 361/687 |
| 6,141,214 A * | 10/2000 | Ahn | 361/687 |
| 6,452,797 B1 * | 9/2002 | Konstad | 361/695 |
| 6,519,149 B1 * | 2/2003 | Inoue | 361/689 |
| 6,671,177 B1 * | 12/2003 | Han | 361/719 |
| 6,681,845 B1 * | 1/2004 | Yeh et al. | 165/122 |
| 6,914,782 B2 * | 7/2005 | Ku | 361/700 |
| 6,924,978 B2 * | 8/2005 | DiStefano | 361/688 |
| 7,248,471 B2 * | 7/2007 | Wabiszczewicz | 361/694 |
| 7,273,089 B2 * | 9/2007 | Hata et al. | 165/104.33 |
| 7,298,615 B2 * | 11/2007 | Wong | 361/687 |
| 7,317,614 B2 * | 1/2008 | Ruch et al. | 361/687 |
| 7,764,493 B2 * | 7/2010 | Ali et al. | 361/679.51 |
| 2004/0125558 A1 * | 7/2004 | DiStefano | 361/687 |
| 2005/0122682 A1 * | 6/2005 | Streit et al. | 361/695 |
| 2009/0000774 A1 | 1/2009 | MacDonald et al. | |

* cited by examiner

*Primary Examiner*—Boris L Chervinsky
(74) *Attorney, Agent, or Firm*—Erik R. Nordstrom (57) ABSTRACT

A cooling system may include a fan which may be placed near the center of the system board. The fan may include bottom inlet and may draw air through an opening in the bottom skin of the computer system and may generate a positive pressure within the computer system. Exhaust vents may be positioned at the periphery.

19 Claims, 9 Drawing Sheets

FIG. 1A

FIG. 1B - Single Outlet Traditional Blower with Top and Bottom Inlets

FIG. 5 - Radial Blower with Bottom Inlet and Ducted Side Inlet

FIG. 6 – Radial Blower with Bottom Inlet

CENTRAL PRESSURING FAN WITH BOTTOM INLETS FOR NOTEBOOK COOLING

FIELD OF THE INVENTION

The present invention generally relates to cooling systems. More specifically, the present invention relates to cooling computer systems using a central pressuring fan.

BACKGROUND

As computer systems become faster, electronic components in the computer systems generate more heat requiring more efficient cooling techniques. There are different techniques to provide cooling. They may be classified generally as passive cooling or active cooling. Passive cooling techniques are typically quieter as compared to active cooling techniques since they don't generally include an air moving device such as a fan or a liquid moving device such as a pump. Active cooling techniques on the other hand may be more effective than the passive cooling techniques. In the active cooling techniques, many different factors may affect their cooling capacity and application. These factors may include fan size, placement, noise, etc.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

For one embodiment, an apparatus and a method for cooling electronic components in a computer system is disclosed. The cooling system may include a fan which may be placed near the center of the system board. The fan may include bottom inlet and may draw air through an opening in the bottom skin of the computer system and may generate a positive pressure within the computer system. Exhaust vents may be positioned at the periphery.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Reference in the specification to "one embodiment" or "an embodiment" of the present invention means that a particular feature, structure or characteristic described in connection with the embodiment is included in at least one embodiment of the present invention. Thus, the appearances of the phrase "for one embodiment" or "in accordance with one embodiment" appearing in various places throughout the specification are not necessarily all referring to the same embodiment.

Cooling System with Fan Positioned Near Edge of System

Figure 1A:
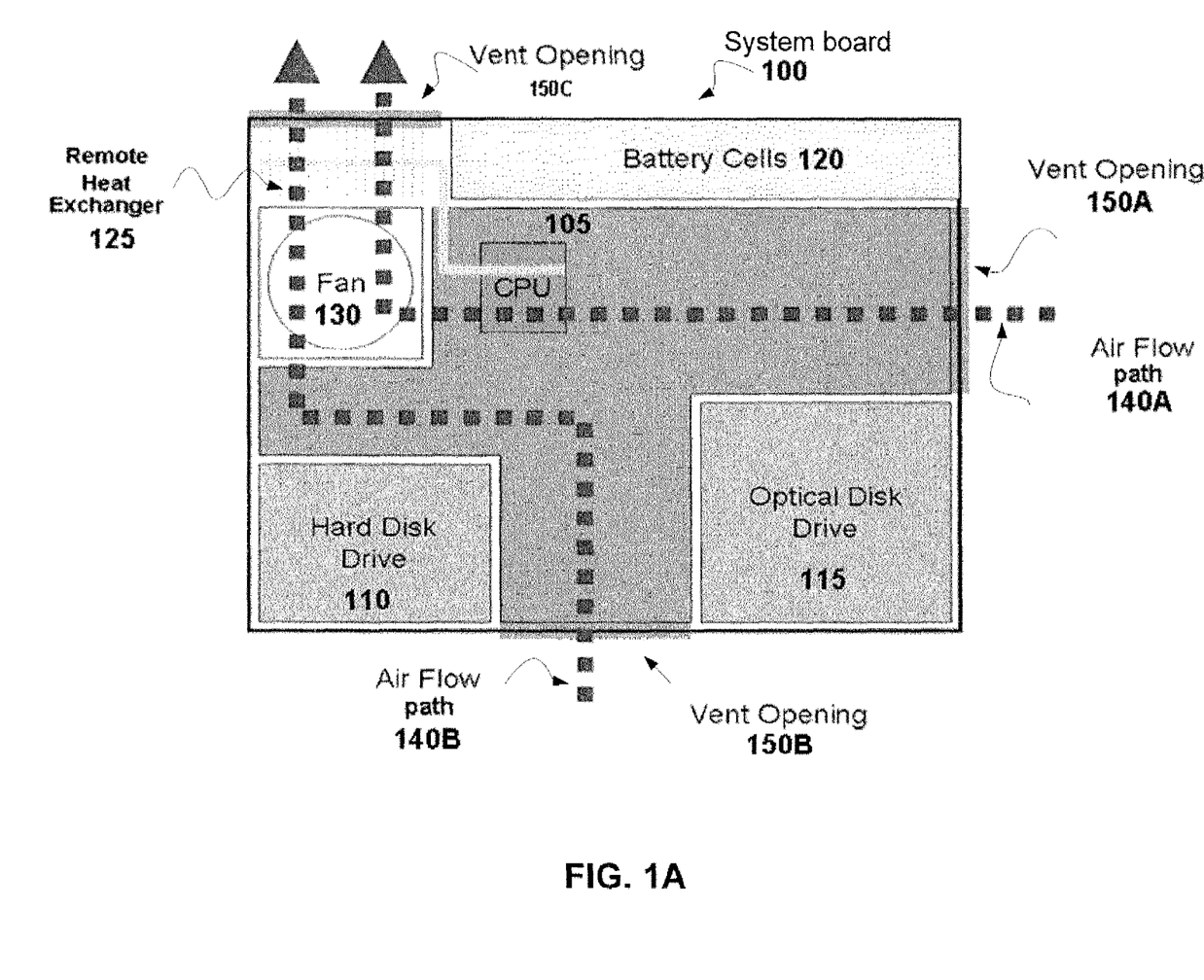
FIGS. 1A-1B is a block diagram illustrating an example of a typical cooling system, in accordance with some embodiments.

FIG. 1A is a block diagram illustrating an example of a typical cooling system of a computer system, in accordance with some embodiments. System board 100 may be included in an enclosure 190 (illustrated in FIG. 1B) associated with a computer system. The system board 100 may include many different electronic components which may be capable of generating heat when in operation. For example, some of these components may include processor 105, hard disk drive 110, optical drive 115, battery cell 120, etc. A remote heat exchanger (RHX) 125 may be used to provide cooling. As illustrated, a heat pipe may be coupled to the processor 105 at one end and to the RHX 125 at the other end. The RHX 125 may be coupled to fan 130 which may be used to draw air into the enclosure 190 and cause the air to flow across the system board 100 for cooling.

The fan 130 may typically be a single outlet blower fan with top and bottom inlets. The air may enter the enclosure 190 through air vent openings 150A-150B. It may pick up heat as it flows across the system board 100 and the remote heat exchanger 125, and it may exit the enclosure 190 through exhaust air vent opening 150C. The air may also enter the enclosure 190 through bottom air vent opening 172 (illustrated in FIG. 1B) located underneath the fan 130.

The dotted lines illustrate air flow paths as the air travels across the system board 100. The airflow paths include airflow path 140A and airflow path 140B. In a typical cooling configuration, the RHX 125 and the fan 130 are positioned at or near the edge of the enclosure 190 (or system board 100) adjacent to the exhaust air vent opening 150C. The cooling system illustrated in FIG. 1A is typically known as an evacuative system.

One disadvantage of the typical cooling system illustrated in FIG. 1A is the long flow paths of the air flow paths 140A and 140B from the air vent openings 150A and 150B to the air vent opening 150C, respectively. This may mean that air may need to flow across the entire length of the system board 100 before it reaches an exhaust air vent opening. The long air flow paths may reduce cooling effectiveness of the cooling system since the air may be warmer toward the end of the air flow paths. For example, by the time the air following the air flow paths 140A and 140B reaches the RHX 125, the air may already be warm and therefore may not be able to cool the RHX 125 or the processor 105 effectively.

Figure 1B:
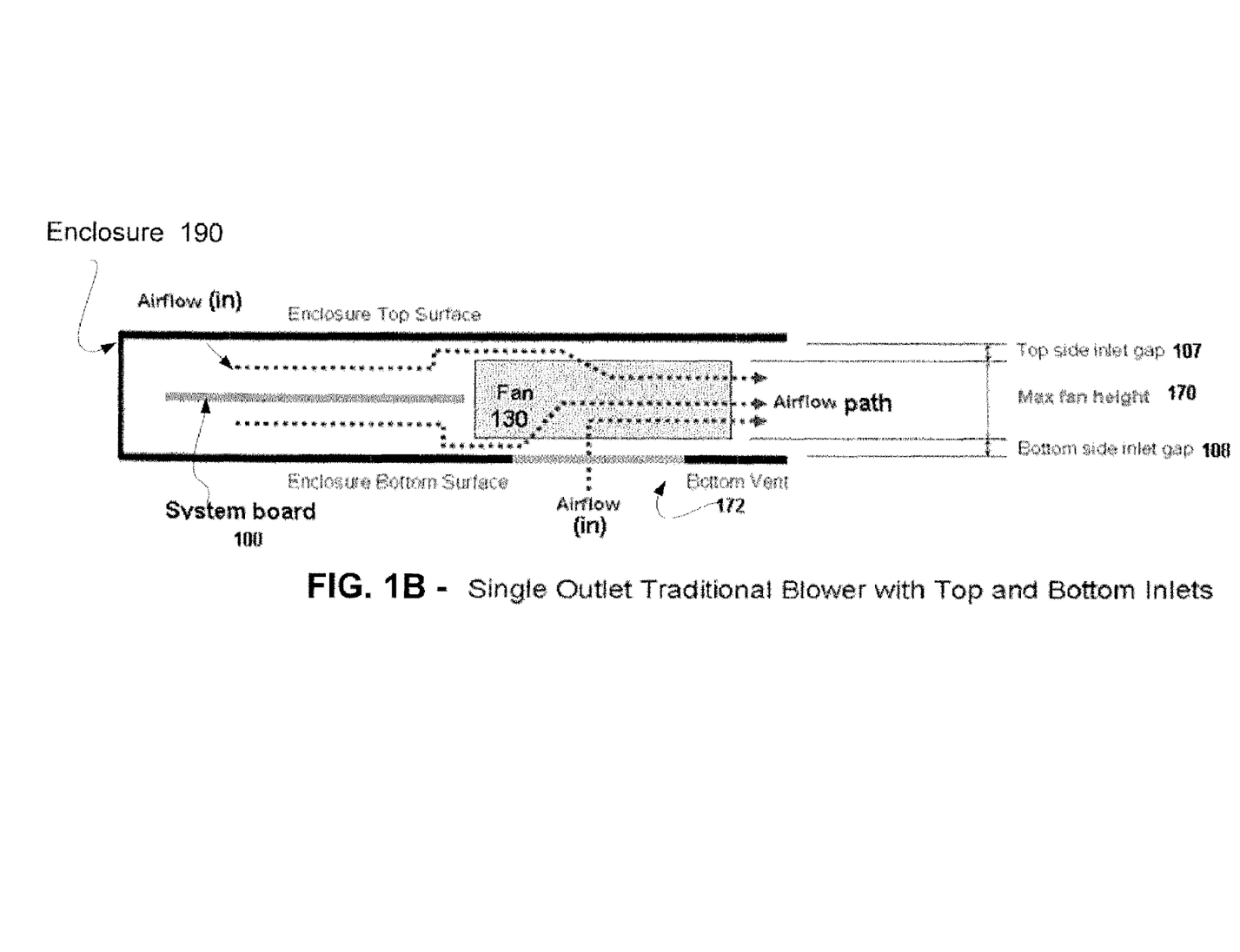

Another disadvantage of the typical cooling system illustrated in FIG. 1A is the requirement of the inlet gaps above and below the fan 130. These inlet gaps may be used to allow air to be drawn into the fan 130, as illustrated in FIG. 1B. These inlet gaps are between the top and/or bottom of the fan 130 and the top and bottom surfaces of the enclosure of the computer system. FIG. 1B illustrates an example of a cross section of the computer system having a typical cooling system, in accordance with some embodiments. Top side inlet gap 107 and bottom side inlet gap 108 may limit the fan 130 to a maximum height 170. The inlet gaps 107 and 108 may typically be between one and three millimeters (mm). The inlet gaps 107 and 108 may enable air from the air vent openings 150A and 150B to be drawn into the enclosure 190 toward the fan 130. Air may also be drawn in by the fan 130 through bottom vent 172. The requirement to have the inlet gaps 107 and 108 may limit the size and capacity of the fan 130.

Pressurized Cooling System with Bottom Inlet Fan

Figure 2:
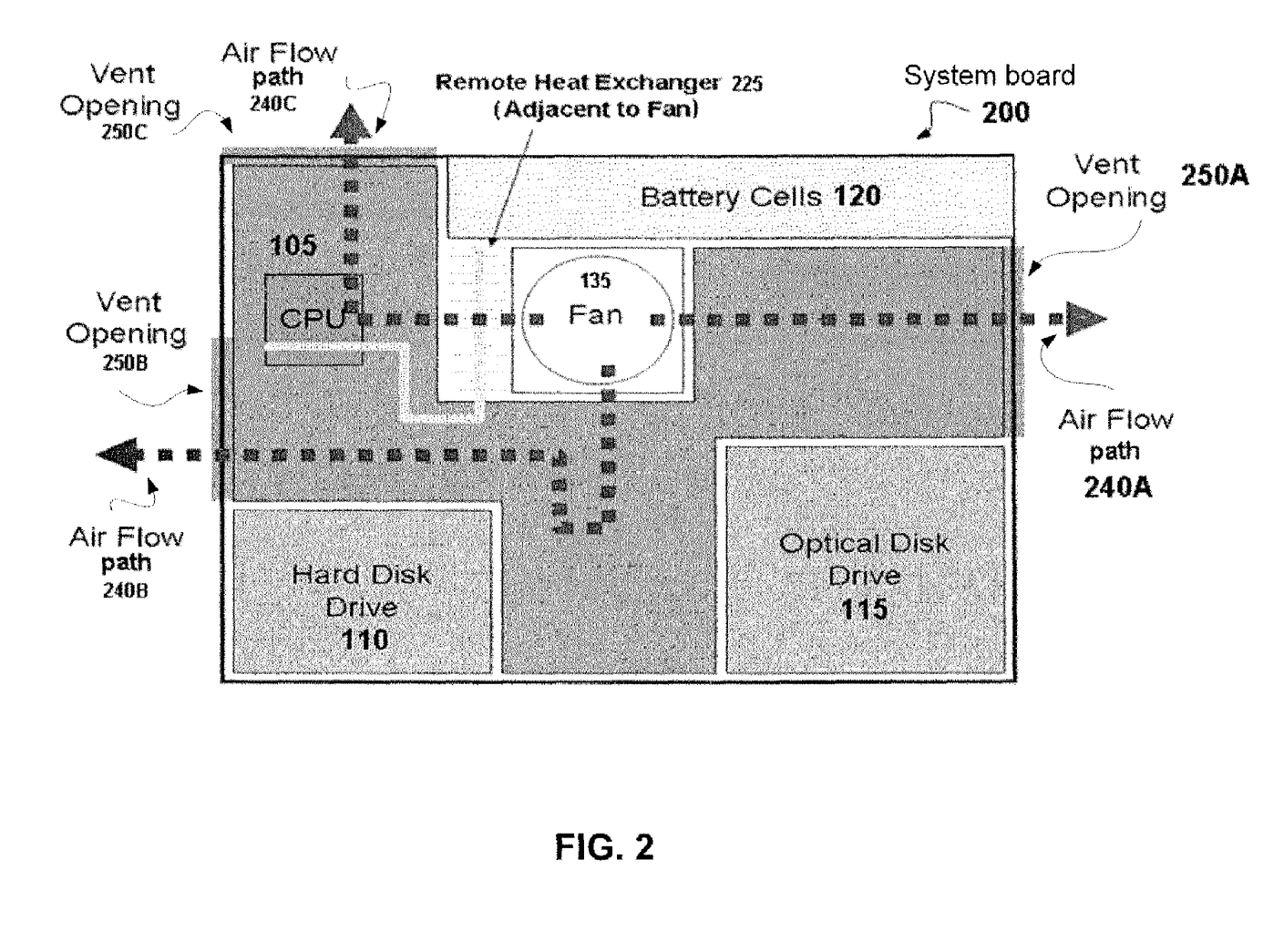
FIG. 2 is a block diagram illustrating one example of an improved cooling system, in accordance with some embodiments.

FIG. 2 is a block diagram illustrating one example of an improved cooling system, in accordance with some embodiments. System board 200 may include similar electronic components as the system board 100, except for the cooling system. The system board 200 may be included in enclosure such as, for example, enclosure 690 (illustrated in FIG. 6). For some embodiments, the system board 200 may include fan 135 which may be a positioned near the center and slightly toward the rear of the system board 200. Placement of the fan 135 in this manner may facilitate acoustic damping of fan noise by the enclosure of the computer system and the electronic components, or by added muffling elements. With the fan 135 being near the center of the system board 200, the exhaust air from the fan 135 may need to flow only approximately half the length of the system board 200 before it reaches an exhaust air vent opening.

The fan 135 may be different from the fan 130 in that the inlet gaps between the top and the bottom of the fan 135 and the top and bottom surfaces of the enclosure 690 may be reduced. For some embodiments, there may be no inlet gaps. This may enable the fan 135 to be larger than the fan 130, and therefore may increase air flow to provide greater cooling capacity. The improvement in the cooling capacity may be approximately linear with the increase in height of the fan 135.

For some embodiment, the fan 135 may be a radial blower with a bottom inlet to draw air from the bottom. The fan 135 may also be a straight or curved-vane caseless radial blower fan. Other types of fan such as, dual outlet blower fan, squirrel cage blower fan, etc. may also be used. In certain configurations, caseless radial blower fans or dual outlet blower fans may produce better cooling performance than a standard single outlet blower fan.

The fan 135 may draw air from a bottom inlet. The bottom inlet may be placed at or near bottom opening 605 (illustrated in FIG. 6) in the bottom of the enclosure 690. The fan 135 may not have any other inlet, and it may have two or more outlets, illustrated by air flow paths 240A-240C.

The fan 135 may generate a positive pressure within the enclosure 690. For some embodiments, exhaust air vent openings may be positioned at the periphery (e.g., side or rear) of the enclosure 690. Depending on the layout of the system board 200, the location of the exhaust air vent openings may vary. It may be possible to have exhaust air vent openings at the top or bottom of the enclosure 690.

Referring to FIG. 2, exhaust vent openings 250A, 250B and 250C are positioned at various places near the edges of the enclosure 690 (or of the system board 200). The air drawn by the fan 135 from the bottom opening 705 may flow across the system board 200, as illustrated by air flow paths 240A, 240B and 240C. It may be noted that the average of the air flow paths 240A-240C may generally be shorter than the average of the air flow paths 140A-140B illustrated in FIG. 1. The shorter air flow paths may result in more effective cooling. It may be noted that the cooling system illustrated in FIG. 2 generally reverses the airflow paths 140A-140B (illustrated in FIG. 1) into the air flow paths 240A-240C.

For some embodiments, RHX 225 may be positioned adjacent to the fan 135 and may be coupled to the processor 105 via a heat pipe. In this configuration, cool air drawn in by the fan 135 may follow the air flow path 240C and may first flow across the RHX 225 and then across the processor 105 in series. This may enable more effective cooling of the RHX 225 due to the short distance that the cool air has to travel from the bottom opening 705 to the RHX 225.

The enclosure 690 may not include any inlet on the interior except for the inlet at the bottom opening 705. This may allow for a pressurized cooling environment. In this environment, flow impedance of the RHX 225 and flow impedance of the enclosure 690 may be separated. This may allow the fan 135 to drive these two flow resistances in parallel, rather than in series. This may reduce the overall system impedance and hence increase air flow. For some embodiments, when the fan 135 includes a greater than 90 degrees outlet which may cause the exhaust air to exit the fan 135 on two or more of its radial sides, there may be an increase in airflow in a low impedance system (flatter fan curve). This may enable reduction in fan noise. Using a radial blower fan such as, for example, the fan 135 may allow for an increase in the number of components on a system board and an increase in system powers.

Cooling System with Ducted Air Flow Path

Figure 3A:
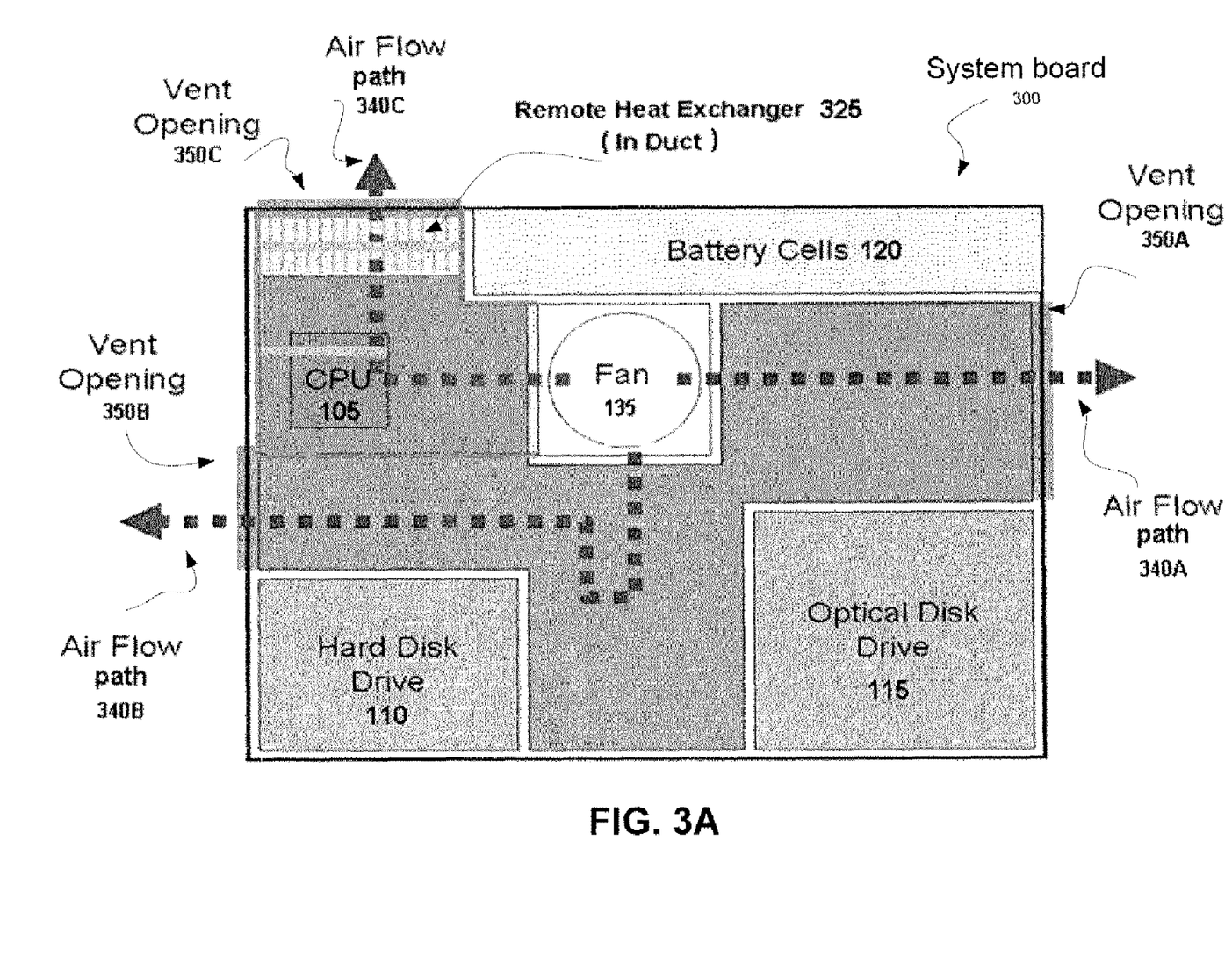
FIGS. 3A-3B is a block diagram illustrating an example of an improved cooling system using duct, in accordance with some embodiments.

FIG. 3A is a block diagram illustrating another example of an improved cooling system, in accordance with some embodiments. System board 300 may include similar electronic components and may be housed in an enclosure similar to the enclosure 690, except for the cooling system. The enclosure 690 may include air vent openings 350A-350C. As in FIG. 2, the fan 135 and may be a positioned near the center and slightly toward the rear of the system board 300.

For some embodiments, the RHX 325 may be positioned adjacent to an exhaust vent opening such as, for example, vent opening 350C. The RHX 325 may be coupled to the processor 105 via a heat pipe. The processor 105 may be positioned in between the RHX 325 and the fan 135. In this configuration, cool air drawn in by the fan 135 may follow the air flow path 340C and may first flow across the processor 105 and then across the RHX 325 in series. This may enable more effective cooling of the processor 105 due to the short distance that the cool air has to travel from the bottom opening 705 of the fan 135 to the processor 105.

Figure 3B:
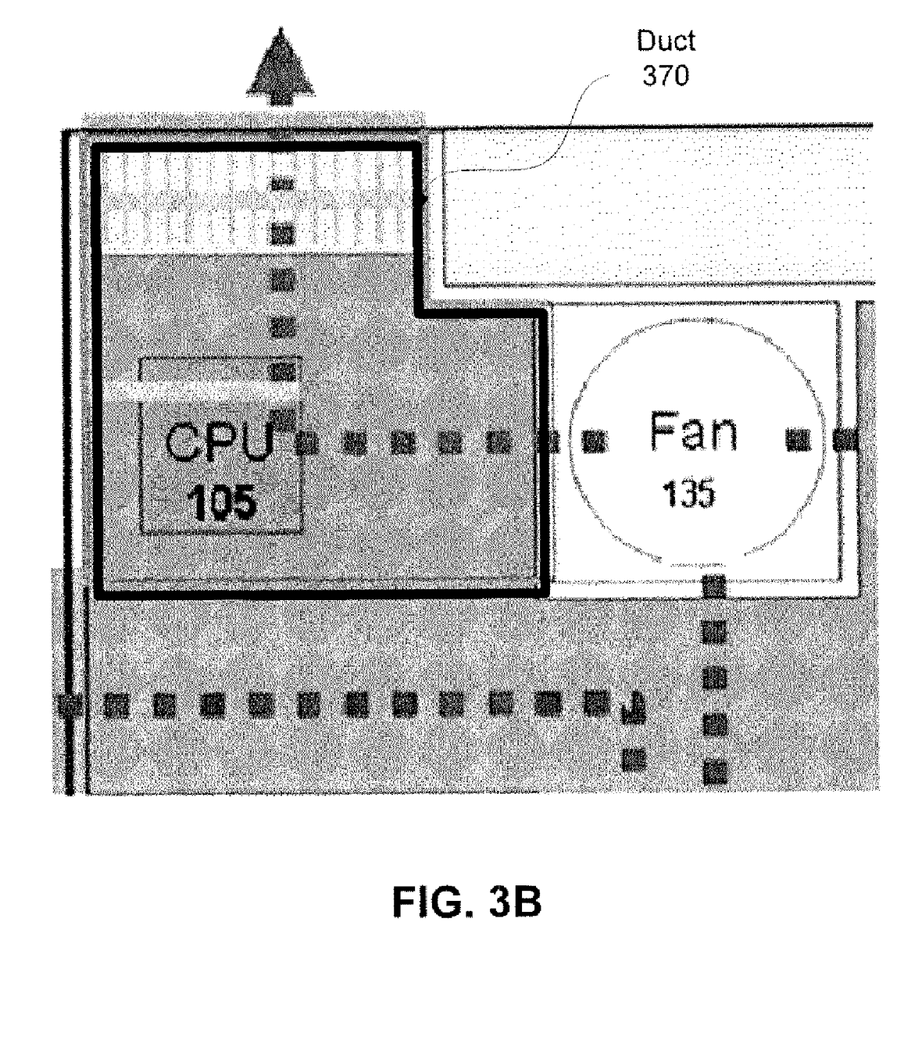

For some embodiments, air movement caused by the fan 135 may be directed toward the RHX 325 using internal duct. FIG. 3B illustrates one portion of a system board illustrated in FIG. 3A where a duct may be used to direct air flow, in accordance with some embodiments. Duct 370 (illustrated in solid lines) may extend from the fan 135 to the RHX 325. In this configuration, the air flow path 340C from the fan 135 to the RHX 325 may be mostly within the duct 370. It may be noted that the fan 135 may accommodate ducted air flow path 340C and non-ducted air flow paths 340A and 340B concurrently.

Figure 4:
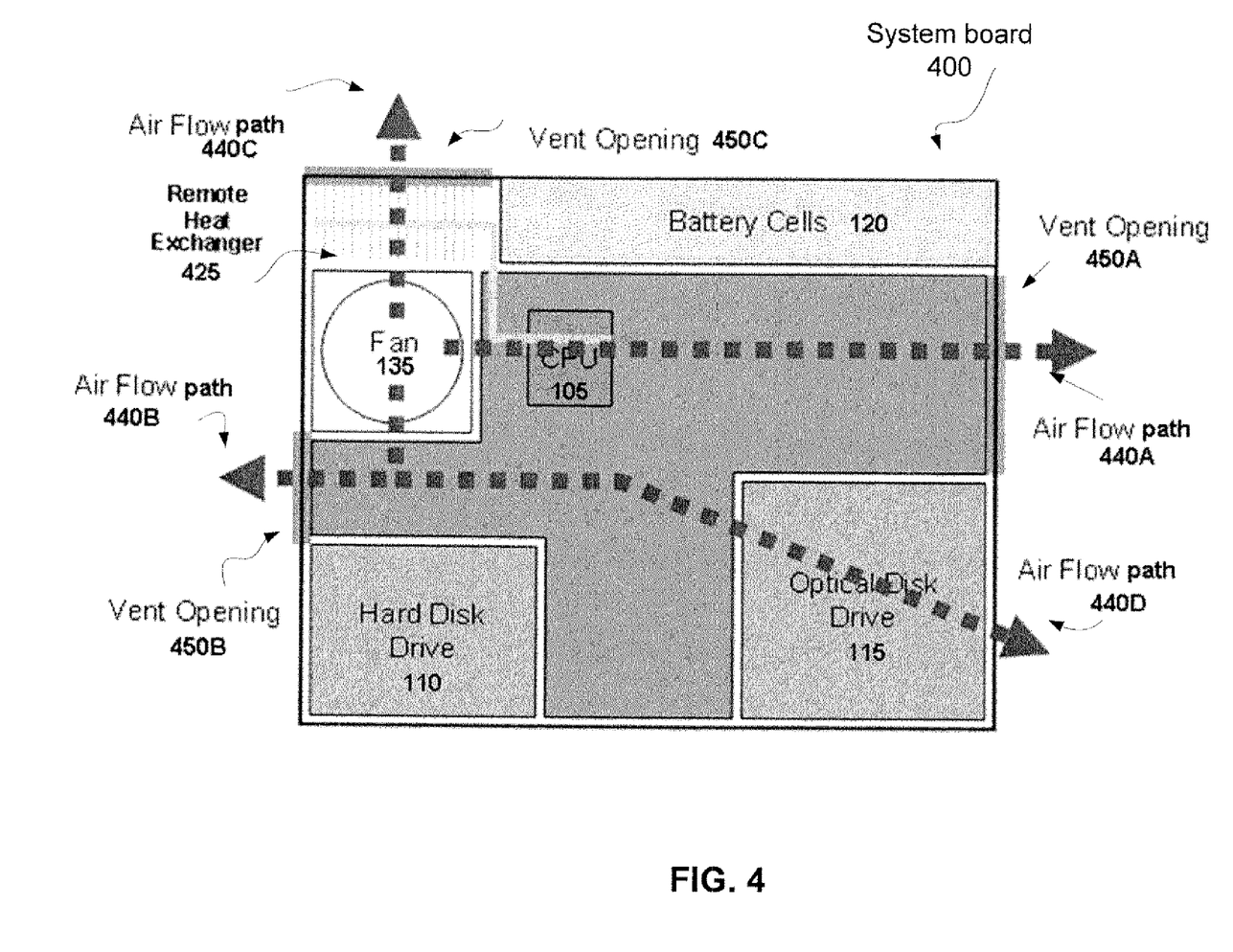
FIG. 4 illustrates another example of an improved cooling system, in accordance with some embodiments.

FIG. 4 illustrates another example of an improved cooling system, in accordance with some embodiments. System board 400 may include similar electronic components and may be housed in an enclosure similar to the enclosure 690, except for the cooling system. The enclosure 690 may include exhaust air vent openings 450A-450C. As in FIG. 3A, the RHX 425 may be positioned near exhaust air vent opening 450C. The RHX 425 may be coupled to the processor 105 via a heat pipe. For some embodiments, the fan 135 may be positioned in between the RHX 425 and the processor 105. In this configuration, cool air drawn in by the fan 135 may follow air flow path 440C and flow across the RHX 425. Cool air drawing in by the fan 135 may also follow the air flow path 440A and flow across the processor 105. This configuration may enable both the RHX 425 and the processor 105 to be cooled in parallel. It may be noted that the fan 135 in the configuration illustrated in FIG. 4 may also generate airflow paths 440B and 440D. Air associated with the air flow path 440D may exit the enclosure 690 via openings related to the installation of the optical disk drive 115.

Cooling System with Ducted Side Inlet

Figure 5:
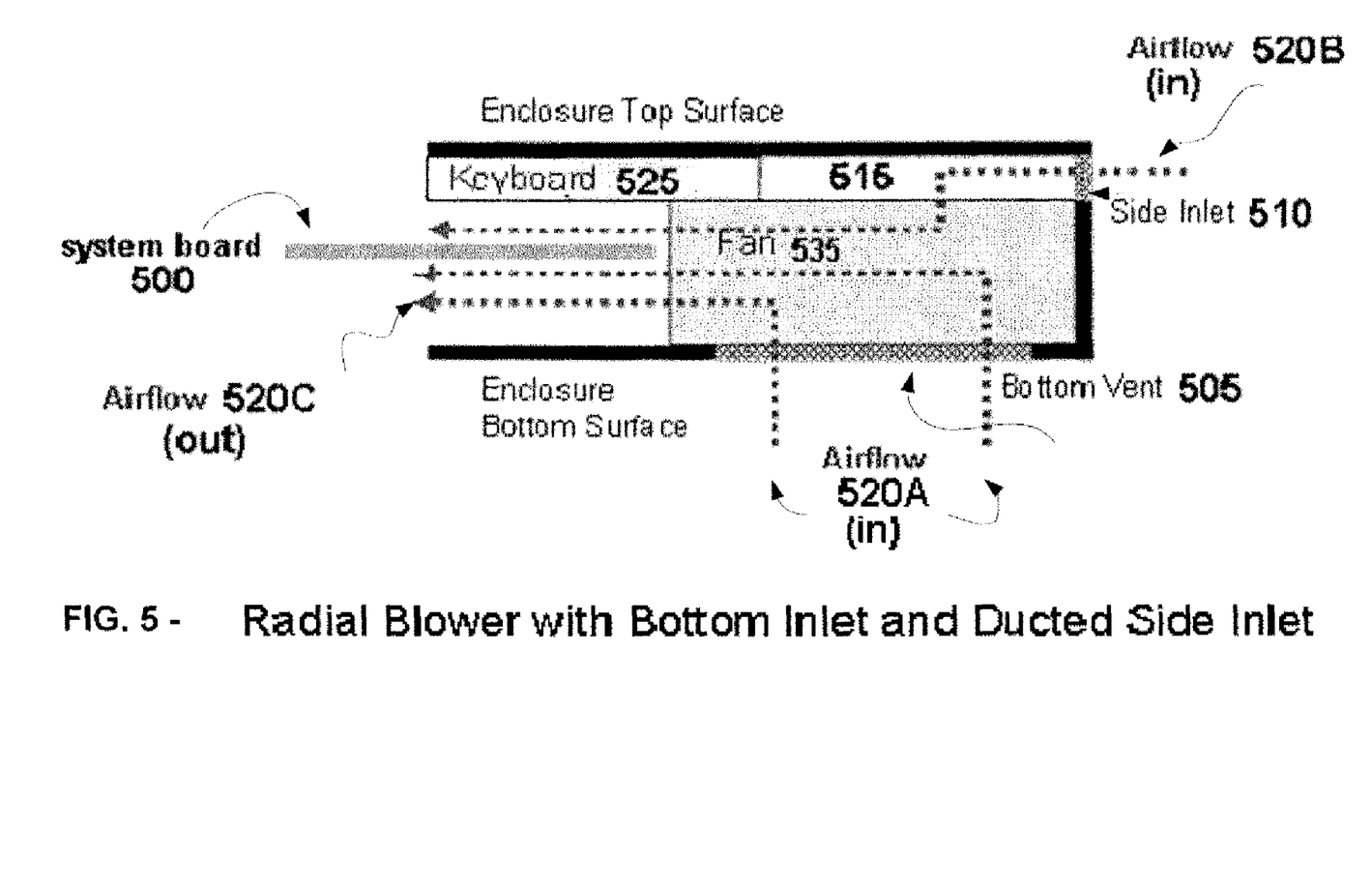
FIG. 5 illustrates another example of an improved cooling system, in accordance with some embodiments.

FIG. 5 illustrates another example of an improved cooling system, in accordance with some embodiments. System board 500 may include similar electronic components and may be housed in an enclosure similar to the enclosure 690, except for the cooling system. The enclosure 690 may include exhaust air vent openings for exhaust air. Fan 535 may include an inlet at its bottom similar to the fan 135. For some embodiments, the fan 535 may also include a side inlet 510. The side inlet 510 may be coupled to a duct to draw air into the fan 535.

Using the duct may enable the air drawn into the enclosure 690 to remain at a relatively similar temperature before it is exhausted by fan 535. Thus, there may be air flow path 520A associated with the bottom inlet (and bottom vent 505) and air flow path 520B associated with the side inlet 510 flowing toward the fan 535 and air flow path 520C flowing away from the fan 535. In the current example, a keyboard 525 may occupy some spacing from the top surface of the enclosure 690, and there may be an inlet gap 515 between the top surface of the enclosure 690 and the top of the fan 535.

Figure 6:
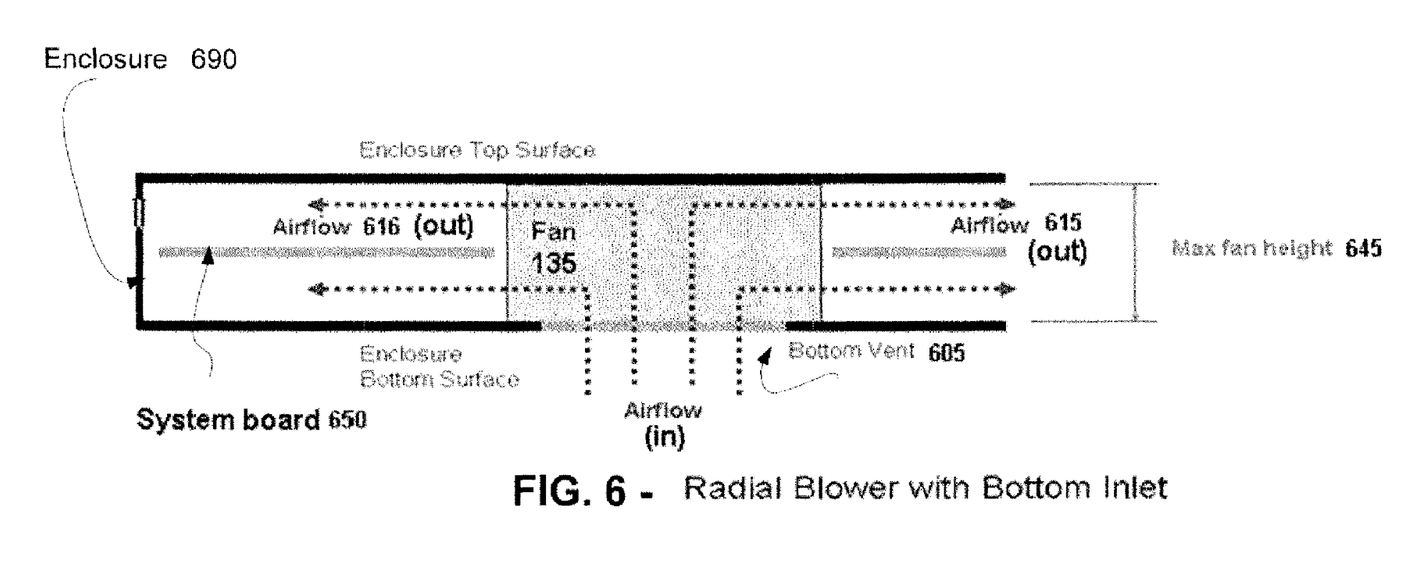
FIG. 6 illustrates an example of a cross section of the computer system having an improved cooling system, in accordance with some embodiments.

FIG. 6 illustrates an example of a cross section of the computer system having an improved cooling system, in accordance with some embodiments. The cooling system illustrated in FIG. 6 may be similar to the improved cooling systems illustrated above in that they all employ a fan that has a bottom inlet. System board 650 may be included in the enclosure 690. The height 645 of the fan 135 may be as much as the space between the top surface and the bottom surface of the enclosure 690. Air may be drawn into the enclosure 690 by the fan 135 through bottom vent 605. Air may be exhausted by the fan 135 according to airflow paths 610 and 615.

Figure 7:
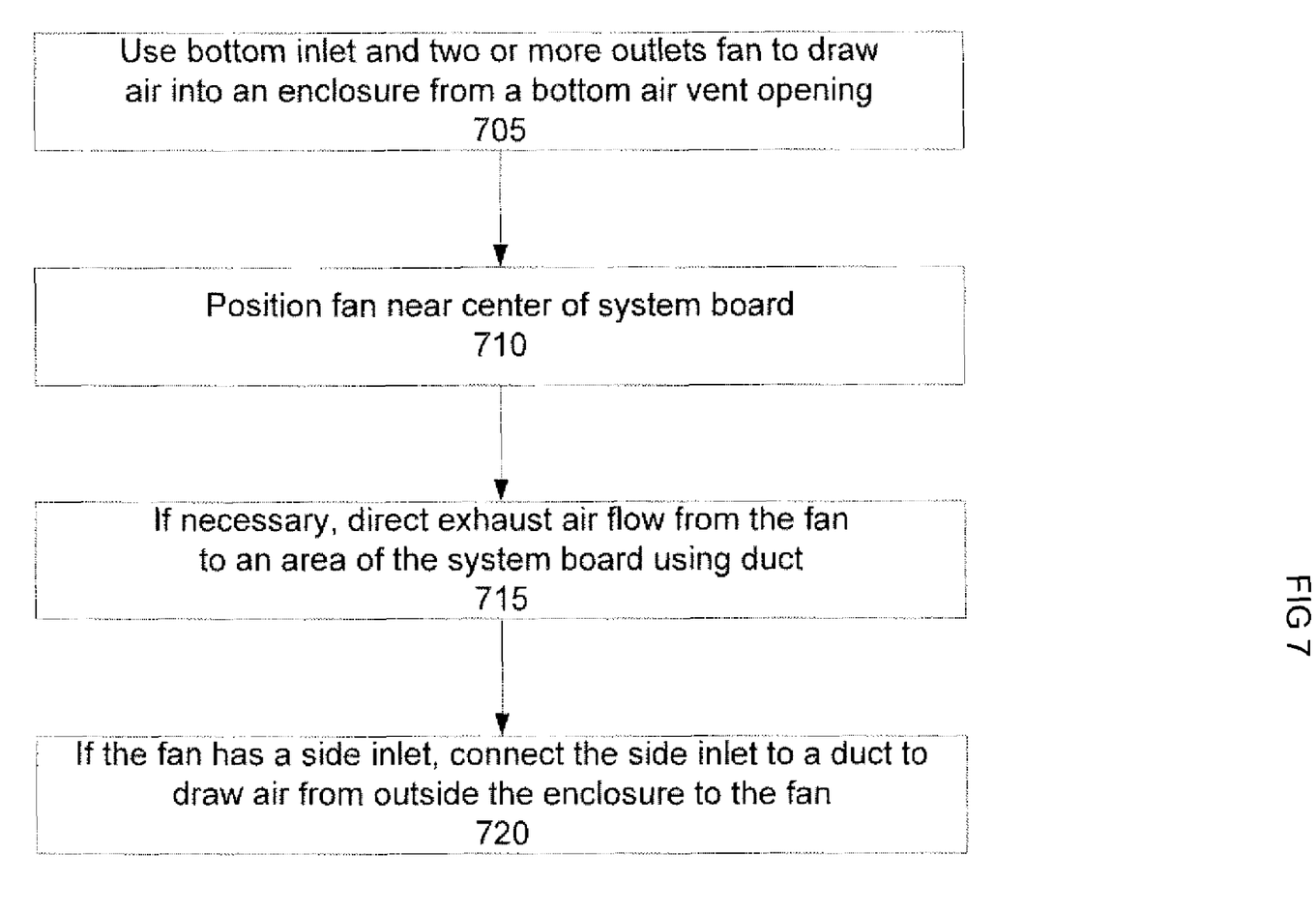
FIG. 7 is a block diagram that illustrates an example of a process that may be used to cool computer systems, in accordance with some embodiments.

FIG. 7 is a block diagram that illustrates an example of a process that may be used to cool computer systems, in accordance with some embodiments. At block 705, a bottom inlet fan may be used to draw air into an enclosure of a computer system. The fan may be a radial blower fan that may generate two or more exhaust air flow paths. At block 710, the fan is to be positioned near middle area of a system board. This may enable short exhaust air flow paths from the fan to the air exhaust vent openings. At block 715, duct may be used to direct one or more air flow paths to components that need cooling. At block 720, if the fan includes a side inlet, a duct may be connected to the side inlet to draw air from outside the enclosure directly to the fan.

Although the present invention has been described with reference to specific exemplary embodiments, it will be evident that various modifications and changes may be made to these embodiments without departing from the broader spirit and scope of the invention as set forth in the claims. For example, the bottom inlet fan may be used with or without any duct. When used with a duct, the duct may be used to cool one or more components located any where on the system board. Furthermore, even though the improved cooling system may be described with notebook or portable computer systems, it may also be applied to non-portable computer systems. Accordingly, the specification and drawings are to be regarded in an illustrative rather than a restrictive sense.

What is claimed is:

1. A method, comprising:
 cooling electronic components on a system board included in an enclosure using a fan positioned near center of the system board, wherein the fan is to have a bottom inlet to draw air exclusively from underneath the fan via a bottom vent opening of the enclosure, said bottom vent opening being at or near the bottom fan inlet to facilitate a positive pressure within the enclosure incident to the electronic components.

2. The method of claim 1, wherein the fan is a curved-vane or a squirrel cage fan.

3. The method of claim 1, wherein the fan is a radial blower fan.

4. The method of claim 1, wherein the fan is to generate positive pressure inside the enclosure.

5. The method of claim 4, wherein height of the fan is similar to spacing between top surface and bottom surface of the enclosure.

6. The method of claim 5, wherein a duct is used to direct exhaust air flow from the fan to an area of the system board.

7. The method of claim 5, wherein the fan is positioned adjacent to a remote heat exchange (RHX) and a processor coupled to the RHX, wherein the RHX and the processor are positioned on the system board.

8. A system, comprising:
 a heat exchanger coupled to a processor; and
 a bottom inlet fan coupled to the heat exchanger and the processor, wherein the fan is capable of generating two or more air flow paths in different directions and to draw air from the bottom inlet to cool the heat exchanger and the processor, wherein the heat exchanger, the processor and the fan are positioned on a system board included in an enclosure, the enclosure having an opening that is coupled to the bottom inlet to generate a positive pressure within the enclosure incident to the electronic components, wherein the fan is positioned near center of the system board.

9. The system of claim 8, wherein the fan is to draw air exclusively from the bottom inlet.

10. The system of claim 9, wherein the fan is to separate flow impedance associated with the heat exchanger and the enclosure.

11. The system of claim 10, wherein a duct is connected to the fan to direct air flow from the fan to an area of the system board.

12. The system of claim 8, wherein the fan further includes a side inlet to draw air from the side inlet and from the bottom inlet.

13. The system of claim 12, wherein a duct is used to draw air from the side inlet.

14. The system of claim 8, wherein the fan is a straight or curved-vane caseless blower fan.

15. The system of claim 8 wherein the fan is a radial blower fan.

16. An apparatus, comprising:

a fan with a bottom inlet and two or more outlets; and a heat exchanger coupled to the fan and to a component capable of generating heat, wherein the fan is to cool the heat exchanger and the component by drawing air into the bottom inlet, wherein the bottom inlet is at or near a bottom opening of an enclosure from which it draws outside air to facilitate a positive pressure within the enclosure incident to the component where the fan is positioned near center of the system board.

17. The apparatus of claim 16, wherein the fan is to draw air into the bottom inlet exclusively and to exhaust air in different directions via the two or more outlets.

18. The apparatus of claim 17, wherein a first duct is coupled to one outlet to direct exhaust air to an area of a system board.

19. The apparatus of claim 16, wherein the fan is to draw air into the bottom inlet and into a side inlet.

* * * * *